(12) United States Patent
Ha et al.

(10) Patent No.: US 8,749,505 B2
(45) Date of Patent: Jun. 10, 2014

(54) TOUCH SCREEN PANEL

(75) Inventors: Sang-Kwon Ha, Yongin (KR); Joo-Hyung Lee, Yongin (KR); Jin-Woo Park, Yongin (KR); Sang-Jin Pak, Yongin (KR); Ji-Gong Lee, Yongin (KR); Hideo Yoshimura, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 256 days.

(21) Appl. No.: 13/284,802

(22) Filed: Oct. 28, 2011

(65) Prior Publication Data

US 2012/0206383 A1   Aug. 16, 2012

(30) Foreign Application Priority Data

Feb. 10, 2011  (KR) .......................... 10-2011-0011954

(51) Int. Cl.
*G06F 3/0488* (2013.01)

(52) U.S. Cl.
USPC ............................. 345/173; 345/174; 345/175

(58) Field of Classification Search
None
See application file for complete search history.

(56) References Cited

U.S. PATENT DOCUMENTS 7,576,731 B2 *   8/2009   Okazaki ........................ 345/173

FOREIGN PATENT DOCUMENTS

KR   10 2004 0057814 A   7/2004
KR   10 2010 0048236 A   5/2010

* cited by examiner

*Primary Examiner* — Joseph Haley
(74) *Attorney, Agent, or Firm* — Christie, Parker & Hale, LLP

(57) ABSTRACT

A touch screen panel includes a display unit including a timing controller for receiving a vertical synchronizing signal and a horizontal synchronizing signal to display an image, a touch sensing unit including driving electrodes, a control signal generator for generating a control signal from the vertical synchronizing signal and the horizontal synchronizing signal, and a touch controller for supplying a driving signal to the touch sensing unit in response to the control signal from the control signal generator.

9 Claims, 4 Drawing Sheets

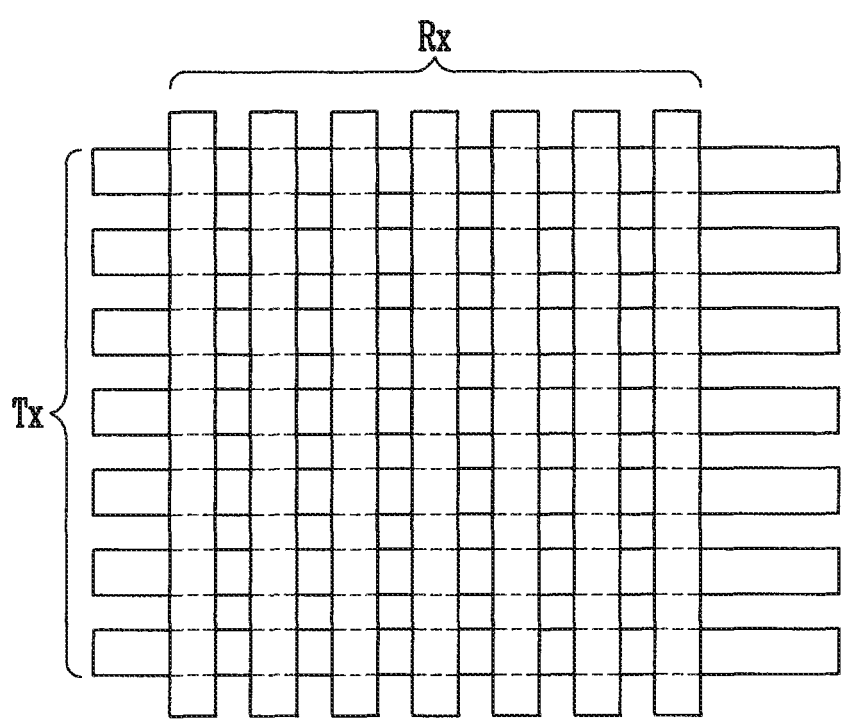

TOUCH SCREEN PANEL

CROSS-REFERENCE TO RELATED APPLICATION

This application claims priority to and the benefit of Korean Patent Application No. 10-2011-0011954, filed on Feb. 10, 2011, in the Korean Intellectual Property Office, the entire content of which is incorporated herein by reference.

BACKGROUND

1. Field

An embodiment of the present invention relates to a touch screen panel, and more particularly, to a touch screen panel for preventing or reducing generation of coupling noise during touch driving.

2. Description of Related Art

A touch screen panel is an input device that displays an image through a display unit, and that recognizes touch from a hand of a user or an object, to receive a command from the user.

Since a touch screen panel can serve to replace an additional input device coupled to an image display device, such as a keyboard or a mouse, the application of touch screen panels is gradually increasing.

Methods of implementing or driving a touch screen panel include a resistance layer method, a photo-sensing method, and an electrostatic capacity method.

Among the above, touch screen panels utilizing the electrostatic capacity method include a plurality of sensing electrodes dispersed in a touch active region to detect a point where electrostatic capacitance changes when a human hand or an object contacts the touch screen panel, to detect a contact position.

SUMMARY OF THE INVENTION

Generally, driving of a conventional touch screen panel is performed independent of vertical synchronizing signals and horizontal synchronizing signals of the display unit.

Therefore, touch driving may be performed while the voltage values of scan signals and data signals supplied by the display unit change. Therefore, when the sensing signals output from the sensing electrodes are read to detect a contact position, coupling noise between the sensing signals and the scan signals and data signals may be generated. Due to such noise, it may be difficult to detect a correct or accurate touch position.

Accordingly, embodiments of the present invention provide a touch screen panel for performing touch driving, for example, during a period where scan signals and data signals are supplied with uniform voltage values, to prevent or reduce the generation of noise and to detect a correct or more accurate touch position.

In an embodiment of the present invention, there is provided a touch screen panel, including a display unit including a timing controller for receiving a vertical synchronizing signal and a horizontal synchronizing signal to display an image, a touch sensing unit including driving electrodes, a control signal generator for generating a control signal from the vertical synchronizing signal and the horizontal synchronizing signal, and a touch controller for supplying a driving signal to the touch sensing unit in response to the control signal from the control signal generator.

The control signal may include a first control pulse and a second control pulse, wherein the touch controller is configured to supply driving signals to the driving electrodes of the touch sensing unit corresponding to at least one of a rising edge or a falling edge of the first or second control pulses.

The touch controller may be configured to supply the driving signals after a delay from said rising edge or falling edge of the first or second control pulses.

The control signal may include a first control signal including the first control pulse and a separate second control signal including the second control pulse.

The rising edge of the first control pulse may coincide with a rising edge of the vertical synchronizing signal, and the falling edge of the first control pulse may coincide with a falling edge of the horizontal synchronizing signal.

The falling edge of the second control pulse may coincide with a falling edge of the horizontal synchronizing signal.

The touch sensing unit may further include sensing electrodes that cross the driving electrodes.

The display unit may further include a pixel region including pixels coupled to scan lines and data lines, a scan driver for supplying scan signals to the pixels through the scan lines, and a data driver for supplying data signals to the pixels through the data lines, wherein the timing controller is configured to control the scan driver and the data driver.

The touch controller may be configured to supply the driving signal to one of the driving electrodes during a period when a scan signal is supplied substantially uniformly to a corresponding scan line and a data signal is supplied substantially uniformly to a corresponding row of the pixels coupled to said scan line.

The timing controller may include the control signal generator.

As described above, according to embodiments of the present invention, a touch screen panel is provided for performing touch driving during a period where scan signals and data signals are supplied with substantially uniform voltage values to prevent or reduce the generation of noise and to detect a correct or more accurate touch position.

BRIEF DESCRIPTION OF THE DRAWINGS

The accompanying drawings, together with the specification, illustrate exemplary embodiments of the present invention, and, together with the description, serve to explain the principles of the present invention.

FIG. 2 is a schematic view illustrating a touch sensing unit according to an embodiment of the present invention;

DETAILED DESCRIPTION OF THE EMBODIMENTS

Figure 1:
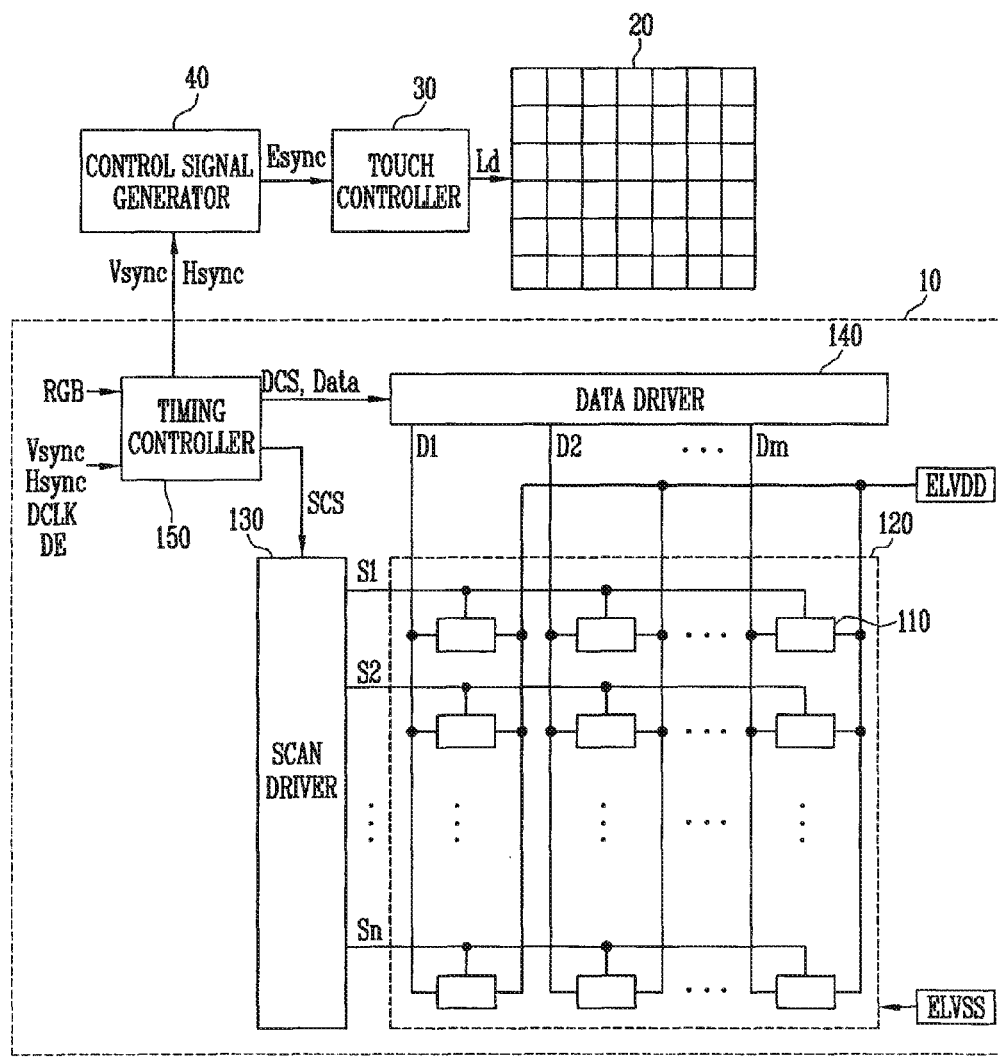
FIG. 1 is a schematic view illustrating a touch screen panel according to an embodiment of the present invention.

Hereinafter, certain exemplary embodiments according to the present invention will be described with reference to the accompanying drawings. The invention may, however, be embodied in many different forms and should not be construed as being limited to the embodiments set forth herein. Here, when a first element is described as being coupled to a second element, the first element may be directly coupled to the second element, or may be indirectly coupled to the second element via one or more additional elements. Further, some of the elements that are not essential to the complete understanding of the invention have been omitted for clarity. Also, like reference numerals refer to like elements throughout.

FIG. 1 is a schematic view illustrating a touch screen panel according to an embodiment of the present invention. FIG. 2 is a schematic view illustrating a touch sensing unit according to the embodiment of the present invention.

Referring to FIG. 1, the touch screen panel according to an embodiment of the present invention includes a display unit 10, a touch sensing unit 20, a touch controller 30, and a control signal generator 40.

The display unit 10 is for displaying an image, and may be, for example, an organic light emitting diode (OLED) display or a liquid crystal display (LCD).

In addition, the display unit 10 controls a scan driver 130 and a data driver 140 included therein, and further includes a timing controller 150 that receives a vertical synchronizing signal Vsync and a horizontal synchronizing signal Hsync for controlling the scan driver 130 and the data driver 140.

In detail, the display unit 10 according to an embodiment of the present invention includes a pixel region 120 including a plurality of pixels 110 coupled to scan lines S1 to Sn and data lines D1 to Dm, the scan driver 130 for supplying scan signals to the pixels 110 through the scan lines S1 to Sn, the data driver 140 for supplying data signals to the pixels 110 through the data lines D1 to Dm, and the timing controller 150 for controlling the scan driver 130 and the data driver 140.

The scan driver 130 generates scan signals in response to a scan driver control signal SCS from the timing controller 150, and supplies the generated scan signals to the scan lines S1 to Sn.

The data driver 140 supplies data signals to the pixels 110 in accordance with the scan signals supplied by the scan driver 130 and a data driver control signal DCS.

The timing controller 150 organizes RGB data supplied from the outside and supplies the RGB data to the data driver 140 to drive the display unit 10. In addition, the timing controller 150 generates the scan driver control signal SCS and the data driver control signal DCS, for example, using a dot clock DCLK, a data enable signal DE, and the vertical and horizontal synchronizing signals Vsync and Hsync input from the outside, supplies the scan driver control signal SCS and the data driver control signal DCS to the scan driver 130 and the data driver 140, and controls the drivers 130 and 140.

The touch sensing unit 20 includes a plurality of driving electrodes Tx that receive driving signals Ld from the touch controller 30.

Referring to FIG. 2, the touch sensing unit 20 may include the plurality of driving electrodes Tx and a plurality of sensing electrodes Rx that intersect or cross the driving electrodes Tx.

The touch controller 30 measures the sensing signals (e.g., predetermined currents or voltages) output from the sensing electrodes Rx, to detect a change in electrostatic capacitance and to determine a touch position.

The driving electrodes Tx and the sensing electrodes Rx of the touch sensing unit 20 may be formed of a transparent conductive material such as indium tin oxide (ITO), indium zinc oxide (IZO), carbon nano tube (CNT), and/or graphene.

In addition, the shapes of the driving electrodes Tx and the sensing electrodes Rx are not limited to a bar shape as illustrated in FIG. 2, but may be otherwise shaped, for example, diamond shaped.

The driving electrodes Tx and the sensing electrodes Rx may be positioned in a same layer or may be positioned in different layers.

The touch controller 30 supplies a driving signal or signals Ld to the touch sensing unit 20 according to (e.g., in synchronization with) a control signal Esync to remove or reduce coupling noise that may be generated between the sensing signals from the touch sensing unit 20 and the scan signals and data signals supplied by the display unit 10.

Figure 3A:
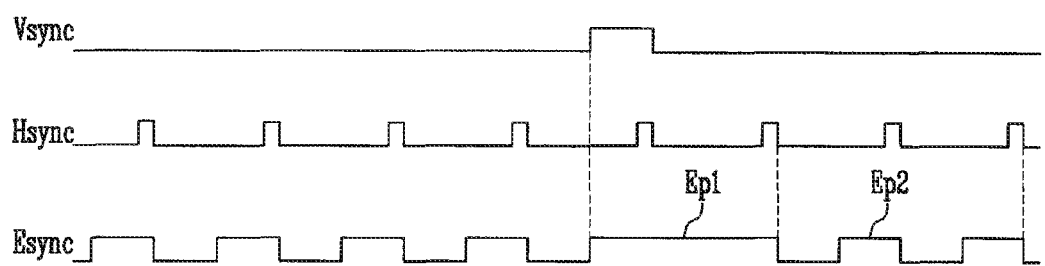
FIGS. 3A and 3B are waveform charts illustrating control signals according to an embodiment of the present invention.
Figure 3B:
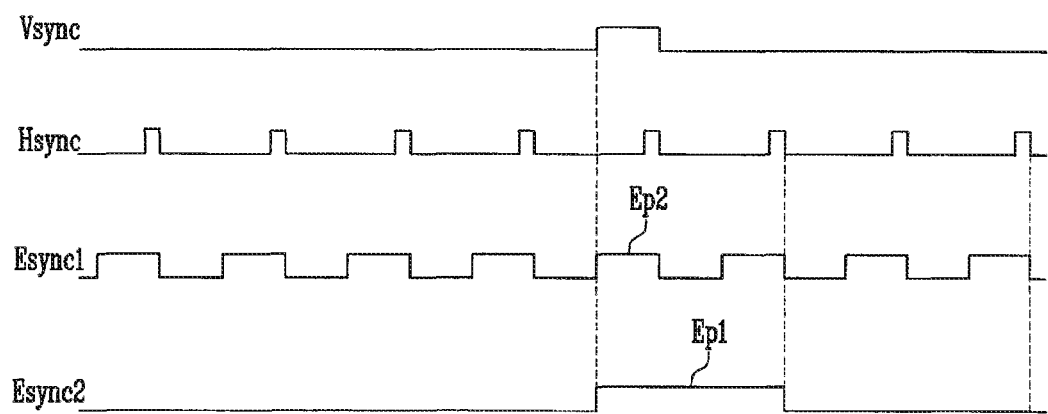

FIGS. 3A and 3B are waveform charts illustrating control signals according to an embodiment of the present invention.

The control signal or signals Esync supplied to the touch controller 30 are generated by the control signal generator 40.

The control signal or signals Esync are generated corresponding to the vertical synchronizing signal Vsync and the horizontal synchronizing signal Hsync, so that the touch controller 30 can time and supply the driving signal Ld according to the vertical synchronizing signal Vsync and the horizontal synchronizing signal Hsync.

Therefore, the control signal generator 40 may receive the vertical synchronizing signal Vsync and the horizontal synchronizing signal Hsync from the timing controller 150, or directly from another source or from the outside.

In addition, the control signal generator 40 may either be separate from the timing controller 150, or may be included in the timing controller 150.

The control signal Esync includes a first control pulse Ep1 and a second control pulse Ep2. As illustrated in FIG. 3A, the pulses Ep1 and Ep2 may be included in one control signal Esync. Alternatively, as illustrated in FIG. 3B, the pulses Ep1 and Ep2 may be included separately in, for example, a first control signal Esync1 and a second control signal Esync2, respectively.

The touch controller 30 may supply the driving signal Ld to the driving electrodes Tx of the touch sensing unit 20 to correspond to, for example, the falling edges or the rising edges of the first control pulse Ep1 and/or the second control pulse Ep2.

In addition, for the driving signal Ld to be supplied to the driving electrodes Tx in a period where the scan signals and the data signals output from the display unit 10 maintain substantially uniform voltage values, the touch controller 30 may start to supply the driving signal Ld after a lapse of a period (e.g., a predetermined period) from rising edges or falling edges of the pulses Ep1 and/or Ep2.

That is, a period between the rising edges or the falling edges of the pulses Ep1 and/or Ep2 may be set for providing the driving signal Ld, where the period may be variously designed or set in accordance with characteristics of the particular touch screen panel.

Figure 4:
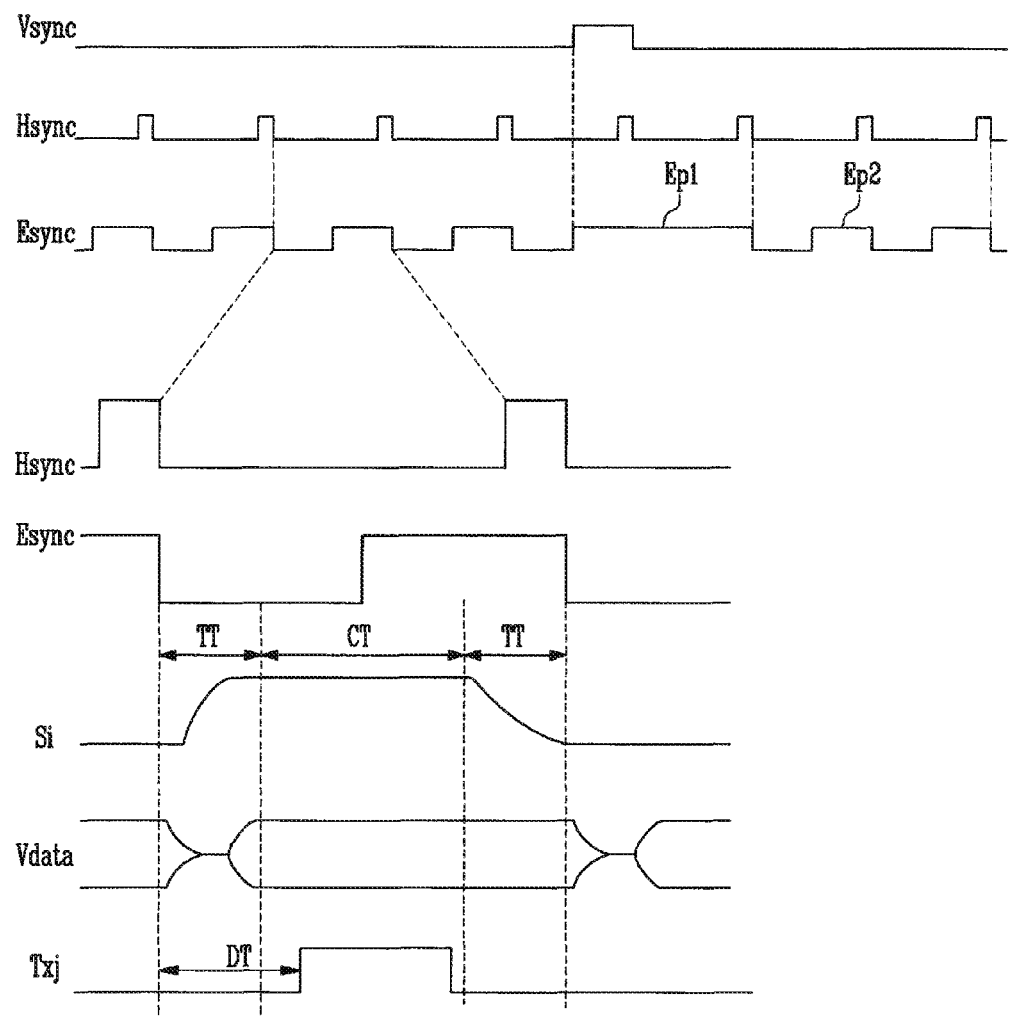
FIG. 4 is a waveform chart illustrating that a touch controller according to an embodiment of the present invention supplies driving signals.

FIG. 4 is a waveform chart illustrating that a touch controller according to an embodiment of the present invention supplies driving signals.

The touch controller 30 supplies the driving signal Ld to the driving electrodes Tx corresponding to the control signal Esync input by the control signal generator 40.

At this time, the touch controller 30 supplies the driving signal Ld to a specific driving electrode Txj during a period CT where the scan signal supplied to a specific scan line Si and a data signal Vdata supplied to the pixels of a row coupled to the scan line Si are uniformly supplied (e.g., remain substantially constant).

As illustrated in FIG. 4, the scan signals and the data signals have a stable period CT in which a substantially uniform voltage value is maintained. Ideally, it would be preferable to directly enter the stable period CT. However, in practice, a transition period TT occurs in which the voltage values change to the voltage values during the stable period CT.

Therefore, when the touch sensing unit 20 is driven during the transition period TT, coupling noise may be generated between the sensing signals and the scan signals and data signals, so that it may be difficult to detect a correct or accurate touch position.

Therefore, the driving signal Ld is supplied to the driving electrodes Tx in the stable period CT where the scan signals and the data signals have substantially uniform voltage values, so that the generation of noise may be prevented or reduced.

Therefore, the touch controller 30 sets a delay period DT with respect to the rising edges or the falling edges of the first control pulse Ep1 and/or the second control pulse Ep2 in the control signal Esync, so that the driving signal Ld is supplied during the stable period CT. That is, the start and the end of the supply of the driving signal Ld may be performed during the stable period CT.

In FIG. 4, a delay period DT set based on a falling edge of the second control pulse Ep2 is illustrated. Alternatively, a delay period DT may be set based on a rising edge of the second control pulse Ep2. The same may be applied with respect to the first control pulse Ep1.

In FIG. 4, an embodiment in which the scan signals have high level voltages is illustrated. In another embodiment, the scan signals may have low level voltages depending on the driving transistors included in the pixels 110.

The control signal generator 40 according to the embodiment of the present invention generates the control signal Esync using the vertical synchronizing signal Vsync and the horizontal synchronizing signal Hsync.

For example, the rising edge of the first control pulse Ep1 of the control signal Esync may coincide with the rising edge of the vertical synchronizing signal Vsync, while the falling edge of the first control pulse Ep1 of the control signal Esync may coincide with the falling edge of the horizontal synchronizing signal Hsync.

In addition, the falling edge of the second control pulse Ep2 of the control signal Esync may coincide with the falling edge of the horizontal synchronizing signal Hsync, while the rising edge of the second control pulse Ep2 of the control signal Esync may be positioned between the falling edge of the horizontal synchronizing signal Hsync and the rising edge of a following horizontal synchronizing signal Hsync.

The first control pulse Ep1 may have a longer period or duration than the second control pulse Ep2. The touch controller 30 may recognize a pulse as a first control pulse Ep1 when, for example, the pulse lasts longer than a period (e.g., a predetermined period), so that the respective pulses or corresponding frames can be distinguished from each other.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A touch screen panel, comprising:
    a display unit comprising a timing controller for receiving a vertical synchronizing signal and a horizontal synchronizing signal to display an image;
    a touch sensing unit comprising driving electrodes;
    a control signal generator for generating a control signal from the vertical synchronizing signal and the horizontal synchronizing signal; and
    a touch controller for supplying a driving signal to the touch sensing unit in response to the control signal from the control signal generator;
    wherein the control signal comprises a first control pulse and a second control pulse, and wherein the touch controller is configured to supply driving signals to the driving electrodes of the touch sensing unit corresponding to at least one of a rising edge or a falling edge of the first or second control pulses.

2. The touch screen panel as claimed in claim 1, wherein the touch controller is configured to supply the driving signals after a delay from said rising edge or falling edge of the first or second control pulses.

3. The touch screen panel as claimed in claim 1, wherein the control signal comprises a first control signal comprising the first control pulse and a separate second control signal comprising the second control pulse.

4. The touch screen panel as claimed in claim 1, wherein the rising edge of the first control pulse coincides with a rising edge of the vertical synchronizing signal, and wherein the falling edge of the first control pulse coincides with a falling edge of the horizontal synchronizing signal.

5. The touch screen panel as claimed in claim 1, wherein the falling edge of the second control pulse coincides with a falling edge of the horizontal synchronizing signal.

6. The touch screen panel as claimed in claim 1, wherein the touch sensing unit further comprises sensing electrodes that cross the driving electrodes.

7. The touch screen panel as claimed in claim 1, wherein the display unit further comprises:
    a pixel region comprising pixels coupled to scan lines and data lines;
    a scan driver for supplying scan signals to the pixels through the scan lines; and
    a data driver for supplying data signals to the pixels through the data lines,
    wherein the timing controller is configured to control the scan driver and the data driver.

8. The touch screen panel as claimed in claim 7, wherein the touch controller is configured to supply the driving signal to one of the driving electrodes during a period when a scan signal is supplied substantially uniformly to a corresponding scan line and a data signal is supplied substantially uniformly to a corresponding row of the pixels coupled to said scan line.

9. The touch screen panel as claimed in claim 1, wherein the timing controller comprises the control signal generator.

* * * * *